UNITED STATES PATENT OFFICE.

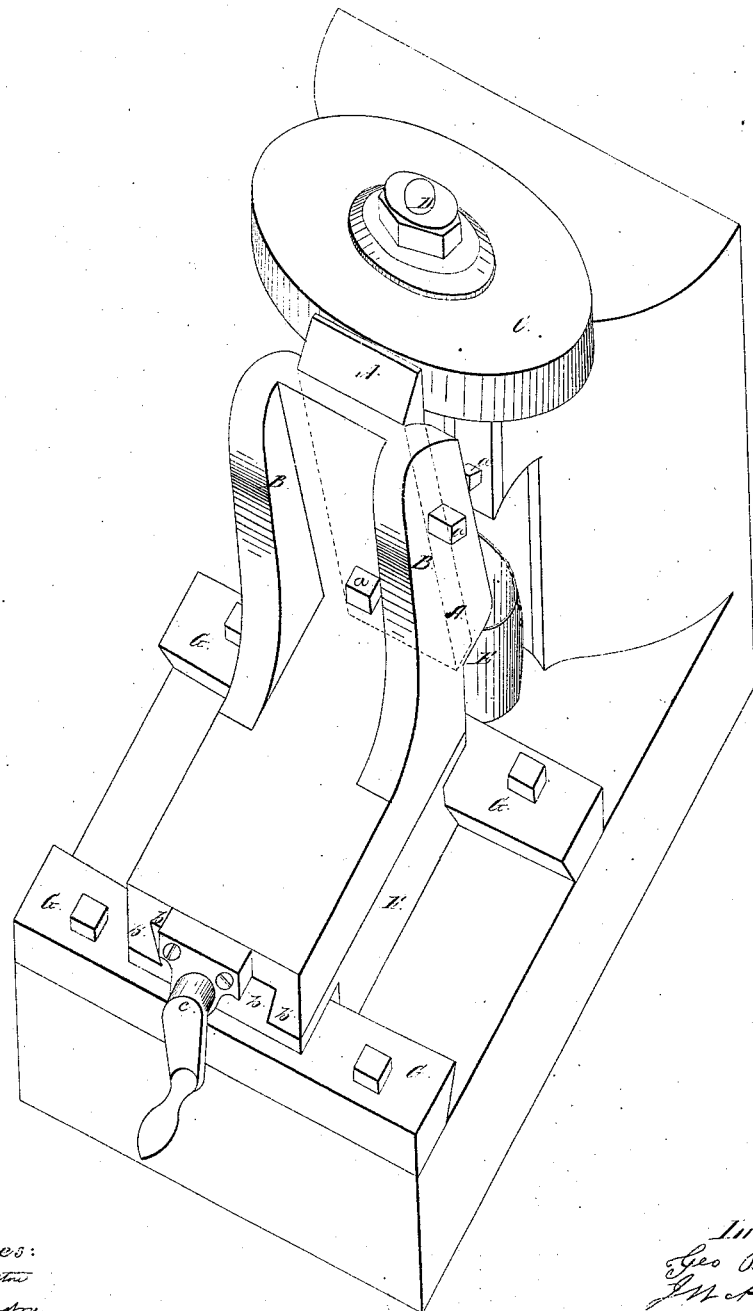

GEORGE B. WIGGIN AND J. W. HOARD, OF PROVIDENCE, RHODE ISLAND.

IMPROVEMENT IN GRINDING THE UPPER CUTTERS OF NAIL-MACHINES.

Specification forming part of Letters Patent No. 38,439, dated May 5, 1863.

*To all whom it may concern:*

Be it known that we, GEO. B. WIGGIN and J. W. HOARD, both of the city and county of Providence, in the State of Rhode Island, have invented a new and useful Machine for Grinding the Upper or Movable Cutter used in a Machine for Cutting Nails; and we do hereby declare that the following specification, taken in connection with the drawings making a part of the same, is a full, clear, and exact description thereof.

In the application for Letters Patent of the United States heretofore made by us for an improved machine for grinding the lower or stationary cutter used in a nail-machine, we have described the necessity of having each cutter ground upon a certain curvature, in order to compensate for the tendency of the metal which is to form the nail to curve itself in the opposite direction while it is being sheared from the plate.

The invention which is the subject of this patent, and which embodies the same general principle or mode of producing the desired result as that described in the patent above referred to, is, nevertheless, exhibited in a different form, arrangement, and combination of parts, inasmuch as the machine is adapted only to grind the upper or movable cutter of a nail-machine.

For the novelties of structure only exhibited in this machine by which the idea, which is common to both patents, is reduced to a practical form do we claim Letters Patent.

As the movable cutter of a nail-machine vibrates in the arc of a circle, and as its face in its path of travel passes by the edge of the lower cutter and as close to it as possible without striking it, it follows that if the edge of the stationary cutter is ground upon a circle whose radius is fifteen feet, the face of the movable cutter must be ground upon the same circle.

In the accompanying drawings, A (shown with red lines) is the cutter placed in the machine ready for grinding at the same angle at which it stands when fixed in the nail-machine. It is secured in the upright clamp B by means of set-screws $a$ $a$ $a$ or other convenient means.

C is an upright wheel composed of emery on vulcanized rubber, or of any other proper material, of about six inches in diameter and one and one-fourth inch in thickness. This wheel is keyed upon an upright shaft, D, which runs in suitable bearings attached to the frame of the machine, and is driven by the pulley E. The clamp B forms a part of the carriage F, and is connected therewith by means of the dovetailed slide and tongue $b$ $b'$, and can be moved toward or away from the grinding-wheel by means of a feed-screw, the handle of which is shown at $c$ and works in a fixed nut in the lower portion of the carriage F. The carriage F is mounted upon a pair of guides, G G, which are of the curvature of a true circle described with a radius which when produced to the grinding-wheel will be fifteen feet in length, or of any other curvature which it is desired to grind the cutter. It will be observed that these guides are curved in the opposite direction from the guides which control the carriage attached to the machine for grinding the stationary cutter described in the patent referred to, so that when motion is communicated to the grinding-wheel, and the carriage is moved from right to left during the grinding operation, the face of the cutter will be ground upon a curve, the reverse of the curve upon which the edge of the stationary cutter has been ground.

What we claim as our invention, and desire to secure by Letters Patent, is—

The arrangement of the grinding-wheel C and the carriage F, for grinding the movable cutter of a nail-machine, substantially as described.

GEO. B. WIGGIN.
J. W. HOARD.

Witnesses:
JAMES T. ANTHONY,
BENJ. T. LUTHER.